US010046675B1

(12) United States Patent
Whitens et al.

(10) Patent No.: US 10,046,675 B1
(45) Date of Patent: Aug. 14, 2018

(54) VEHICLE WITH SLIDABLE SEATS

(71) Applicant: Ford Global Technologies, LLC, Dearborn, MI (US)

(72) Inventors: Michael James Whitens, Milford, MI (US); Dean M. Jaradi, Macomb, MI (US); Cortney Stancato, Novi, MI (US); S. M. Iskander Farooq, Novi, MI (US); Mohammed Omar Faruque, Ann Arbor, MI (US); Saied Nusier, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/585,710

(22) Filed: May 3, 2017

(51) Int. Cl.
| | |
|---|---|
| *B60N 2/06* | (2006.01) |
| *B60N 2/14* | (2006.01) |
| *B60N 2/24* | (2006.01) |
| *B60N 2/22* | (2006.01) |
| *B60N 2/02* | (2006.01) |
| *B60N 2/30* | (2006.01) |
| *B60J 5/06* | (2006.01) |

(52) U.S. Cl.
CPC ........ *B60N 2/24* (2013.01); *B60J 5/06* (2013.01); *B60N 2/0232* (2013.01); *B60N 2/062* (2013.01); *B60N 2/14* (2013.01); *B60N 2/22* (2013.01); *B60N 2/3004* (2013.01); *B60N 2/304* (2013.01); *B60N 2002/0236* (2013.01)

(58) Field of Classification Search
CPC .................................. B60N 2/062; B60N 2/14

USPC ............ 296/65.06–7, 65.11–15; 297/344.11, 297/344.21–344.23
See application file for complete search history.

(56) References Cited

U.S. PATENT DOCUMENTS

| | | | | |
|---|---|---|---|---|
| 2,563,220 | A | * | 8/1951 | Doty ................... B60N 2/146 248/425 |
| 4,155,587 | A | * | 5/1979 | Mitchell ............... B60N 2/245 296/65.12 |
| 4,341,415 | A | | 7/1982 | Braun et al. |
| 5,639,141 | A | | 6/1997 | Hanemaayer |
| 5,746,465 | A | * | 5/1998 | Jones ..................... B60N 2/14 296/65.03 |
| 6,460,929 | B2 | * | 10/2002 | Kamida ............... B60N 2/3006 296/65.11 |
| 7,438,339 | B2 | * | 10/2008 | Abraham ............... B60N 2/14 296/65.09 |
| 7,712,831 | B2 | | 5/2010 | Abt et al. |
| 8,297,700 | B2 | * | 10/2012 | Zahar ................... B60N 2/2821 297/256.12 |
| 9,016,797 | B2 | * | 4/2015 | Iida ..................... B60N 2/0252 280/250.1 |
| 9,027,978 | B2 | * | 5/2015 | Bourgraf ................. A61G 3/00 296/19 |
| 2011/0109114 | A1 | | 5/2011 | Kolpasky et al. |

FOREIGN PATENT DOCUMENTS

| | | |
|---|---|---|
| EP | 2650188 B1 | 4/2013 |
| WO | 2008086123 A2 | 7/2008 |

\* cited by examiner

*Primary Examiner* — Dennis H Pedder
(74) *Attorney, Agent, or Firm* — Frank A. MacKenzie; Bejin Bieneman PLC

(57) ABSTRACT

A vehicle includes a wall having a hanger. The vehicle also includes a floor having a track. A seatback of a seat is supported by the hanger and the track.

14 Claims, 9 Drawing Sheets

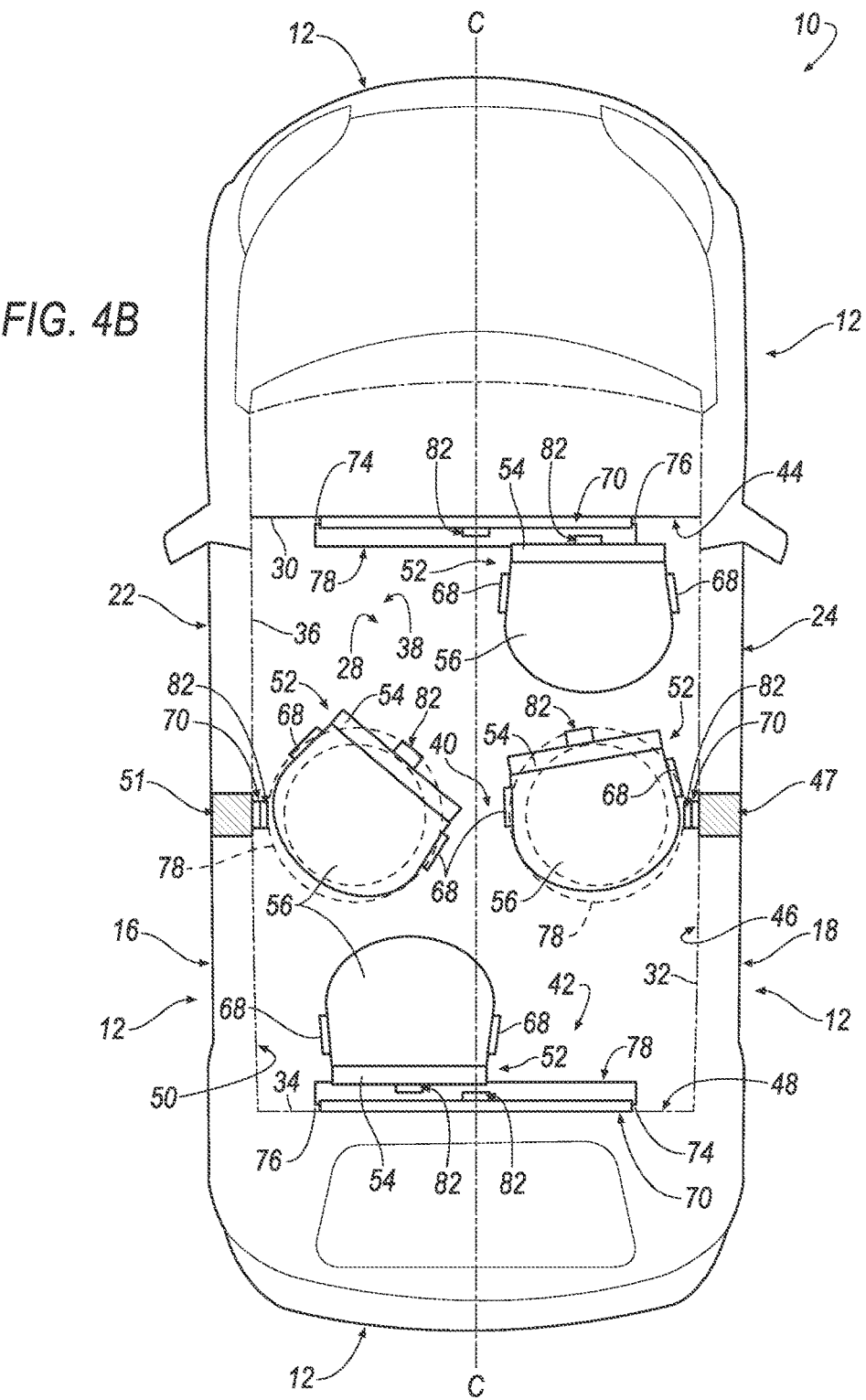

VEHICLE WITH SLIDABLE SEATS

BACKGROUND

With autonomous vehicles, there is an opportunity for vehicle sharing. Vehicle sharing can result in users having different needs for the vehicle depending on the vehicle's use. For example, users may want multiple seating positions to be available when several passengers are traveling together. Other users may want only one or even no vehicle seating when the autonomous vehicle is used for carrying cargo.

BRIEF DESCRIPTION OF THE DRAWINGS

FIG. 4B is a cut-away top view of the vehicle with the seats in a seating position, connectors connected to hangers and seatbacks detached from the connectors, and the seats rotated relative to the floor of the vehicle.

DETAILED DESCRIPTION

Figure 1A:
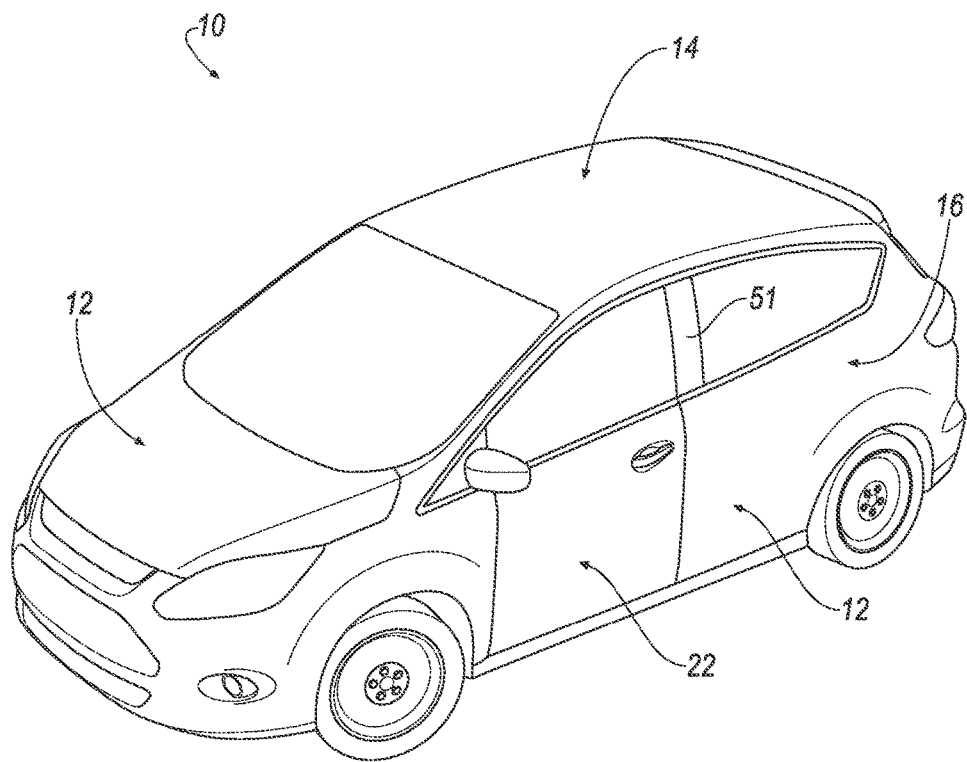
FIG. 1A is a perspective view of a vehicle.

A vehicle includes a floor and a wall. The wall includes a hanger. The floor includes a track. A seatback of a seat is supported by the hanger and the track.

The seatback may be detachably connected to the hanger.

The hanger may be elongated, and the seatback may be slidably connected to the hanger.

The hanger may include a second track and a connector slidably engaged to the second track, and the seatback may be connectable to the connector. Alternatively, the seatback may include the connector, and be connectable to the hanger.

The seatback may include a post. The post may have an upper end detachably mounted to the hanger, and a lower end slidably supported by the track.

A base may be connected to the lower end of the post, and slidably engage the track.

The post may include a motor and a rotatable gear connected to the motor. The track may include a plurality of teeth spaced from each other along a length of the track. The rotatable gear may engage one or more of the plurality of teeth of the track.

The seat may include a seat bottom pivotally attached to the seatback. A spring may engage the seat bottom and the seatback, biasing the seat bottom to a stowed position.

The seat bottom may be pivotable between the stowed position and a seating position. The seatback may disengage from the hanger in the seating position, and the seatback may be rotatable relative to the floor in the seating position.

The seat bottom may extend from a first side to a second side. An armrest may be fixed to the first side.

The track may extend along the floor in a round arrangement.

With reference to the Figures, wherein like numerals indicate like parts throughout the several views, a vehicle 10 has a vehicle body 12. The vehicle body 12 includes an interior space 26. The interior space 26 of the vehicle body 12 is configurable depending on a user's needs. For example, the interior space 26 of the vehicle can be configured to accommodate passengers, to accommodate cargo, to accommodate combinations of passengers and cargo, etc.

The vehicle 10 includes one or more seats 52. At least one of the one or more seats 52 includes a seatback 54. The one of the one or more seats 52 can include a seat bottom 56. The seat bottom 56 can be moveably attached to the seatback 54.

In one approach, the seat bottom 56 can have a proximal end 58 proximate to the seatback 54 and a distal end 60 distal to the seatback 54. The distal end 60 of the seat bottom 56 can pivot in a generally vertical direction away from the seatback 54 to a seating position (FIG. 5A), and pivot in a generally vertical direction towards the seatback 54 to a stowed position (FIG. 5B). Accordingly, when the at least one of the one or more seats 52 are in the seating position, vehicle 10 passengers can sit in the seats 52 when transported by the vehicle 10.

Figure 2:
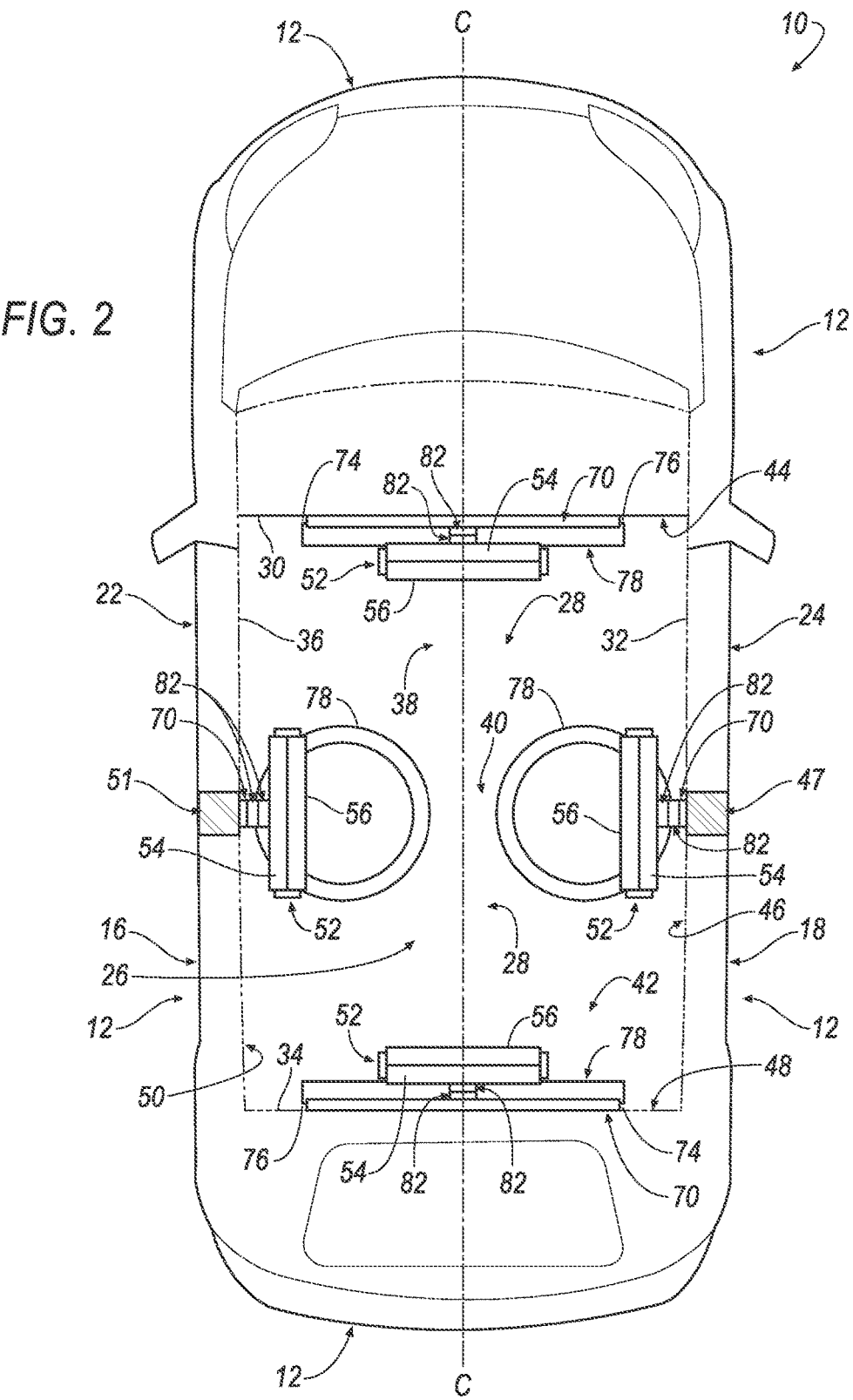
FIG. 2 is a cut-away top view of the vehicle with seats in a stowed position.
Figure 3:
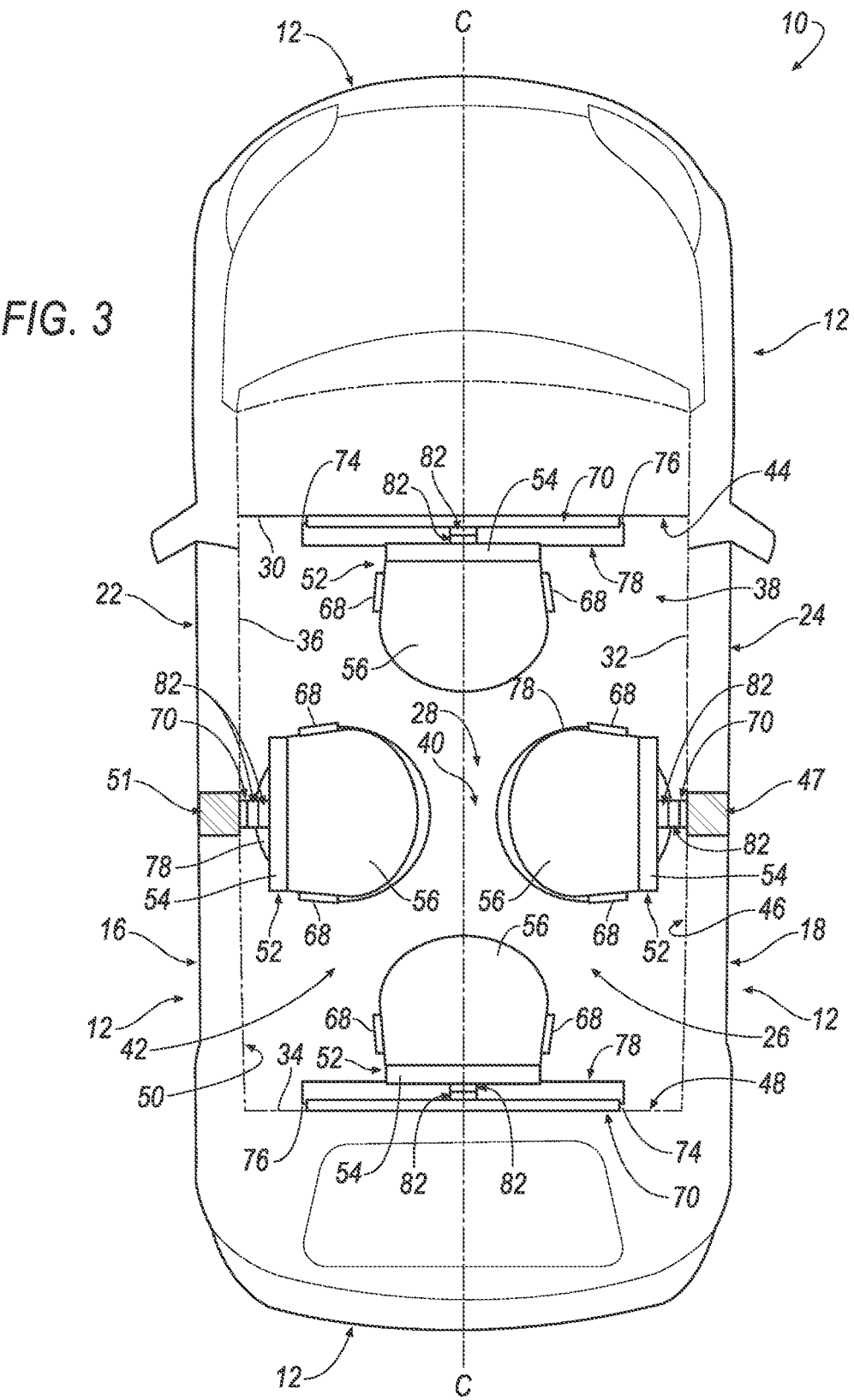
FIG. 3 is a cut-away top view of the vehicle with the seats in a seating position.

If the user wants to configure the interior space 26 to, e.g., use the vehicle 10 to transport cargo, the seat bottoms 56 of the one or more seats 52 can pivot to the stowed position, as shown in FIGS. 2 and 5B. In this way, the interior space 26 of the vehicle 10 can be configured for cargo carrying capacity.

In addition, if the user wants to, e.g., transport passengers and cargo, the seat bottoms 56 of the one or more seats 52 can be placed in the seating position, and any remaining seats 52 placed in the stowed position. The user can thus configure the interior space 26 of the vehicle 10 to transport passengers, to transport cargo, to transport passengers and cargo, and the like.

The vehicle 10 may be of any suitable type. For example, the vehicle 10 can be any type of automobile, such as a car, a truck, a crossover vehicle, a van, a minivan, etc. Moreover, the vehicle 10 may be powered in a variety of known ways, e.g., with an electric motor and/or an internal combustion engine.

The vehicle 10 may be an autonomous vehicle. Autonomous vehicles use a variety of sensors and computing devices to operate the vehicle 10 with various levels of input from a human driver. The computing device of the vehicle 10 may operate the vehicle 10 in an autonomous mode, a semi-autonomous mode, or a non-autonomous mode. An autonomous mode is defined as one in which each of vehicle 10 propulsion, braking, and steering systems are controlled by the computer; in a semi-autonomous mode the computing device controls one or two propulsion, braking, and steering systems of the vehicle 10; in a non-autonomous mode, a human operator controls the propulsion, braking, and steering systems of the vehicle 10.

The Society of Automotive Engineers (SAE) has defined multiple levels of autonomous vehicle operation. At levels 0-2, the human driver monitors or controls almost all driving tasks, generally with no help from the vehicle 10. For example, at level 0 ("no automation"), a human driver is responsible for all vehicle operations. At level 1 ("driver assistance"), the vehicle 10 sometimes assists with steering, acceleration, or braking, but the human driver is still responsible for much of the vehicle control. At level 2 ("partial automation"), the vehicle 10 can control steering, acceleration, and braking under certain circumstances without human interaction. At levels 3-5, the vehicle 10 assumes more driving-related tasks. At level 3 ("conditional automation"), the vehicle 10 can handle steering, acceleration, and braking under certain circumstances, as well as driving environment monitoring. Level 3 still requires the human driver to intervene occasionally. At level 4 ("high automation"), the vehicle 10 can handle the same tasks as at level 3, but without relying on the human driver to intervene in certain driving modes. At level 5 ("full automation"), the vehicle 10 can handle almost all tasks without any human driver intervention.

As discussed above, the vehicle 10 includes a vehicle body 12. The vehicle body 12 can be supported by a frame (not shown). The vehicle body 12 and the frame can be a unibody construction. In the unibody construction, the vehicle body 12, e.g., rocker panels, serves as the frame, and the vehicle body 12 (including the rocker panels, pillars, roof rails, etc.) is unitary, i.e., a continuous one-piece unit.

In another approach, the vehicle body 12 can have a body-on-frame construction (also referred to as a cab-on-frame construction). In other words, the vehicle body 12 and the frame are separate components, i.e., are modular, and the vehicle body 12 is supported on and fixed to the frame. The vehicle body 12 and the frame can have any suitable construction. For example, the vehicle body 12 and/or the frame may be formed of materials such as steel, aluminum, carbon fiber, etc.

The vehicle body 12 includes exterior surfaces, such as a hood, windows, doors, lids and/or hatches. Exterior surfaces of the vehicle body 12 can present a Class-A, substantially defect-free, finely-finished surface appearance. The exterior surfaces can be formed from any functionally suitable material, such as painted steel, aluminum and plastic, etc.

As shown in FIGS. 1A-4B, the vehicle body 12 has a left side 16 and a right side 18. The left side 16 of the vehicle body 12 can include a first door 22. The right side 18 of the vehicle body 12 can include a second door 24. The first and second doors 22, 24 can be configured to permit passenger ingress and egress, loading and unloading of cargo, etc.

Figure 1B:
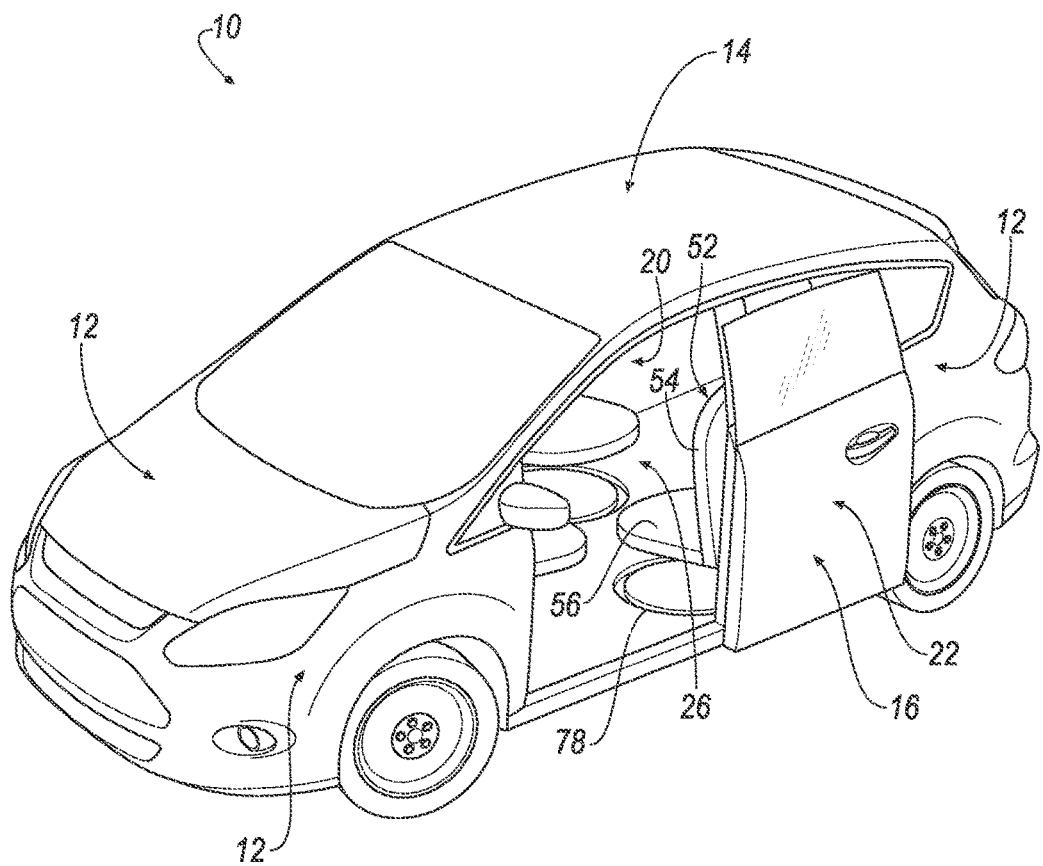
FIG. 1B is a perspective view of the vehicle with a first door on a left side of the vehicle shown in an open position.
Figure 1C:
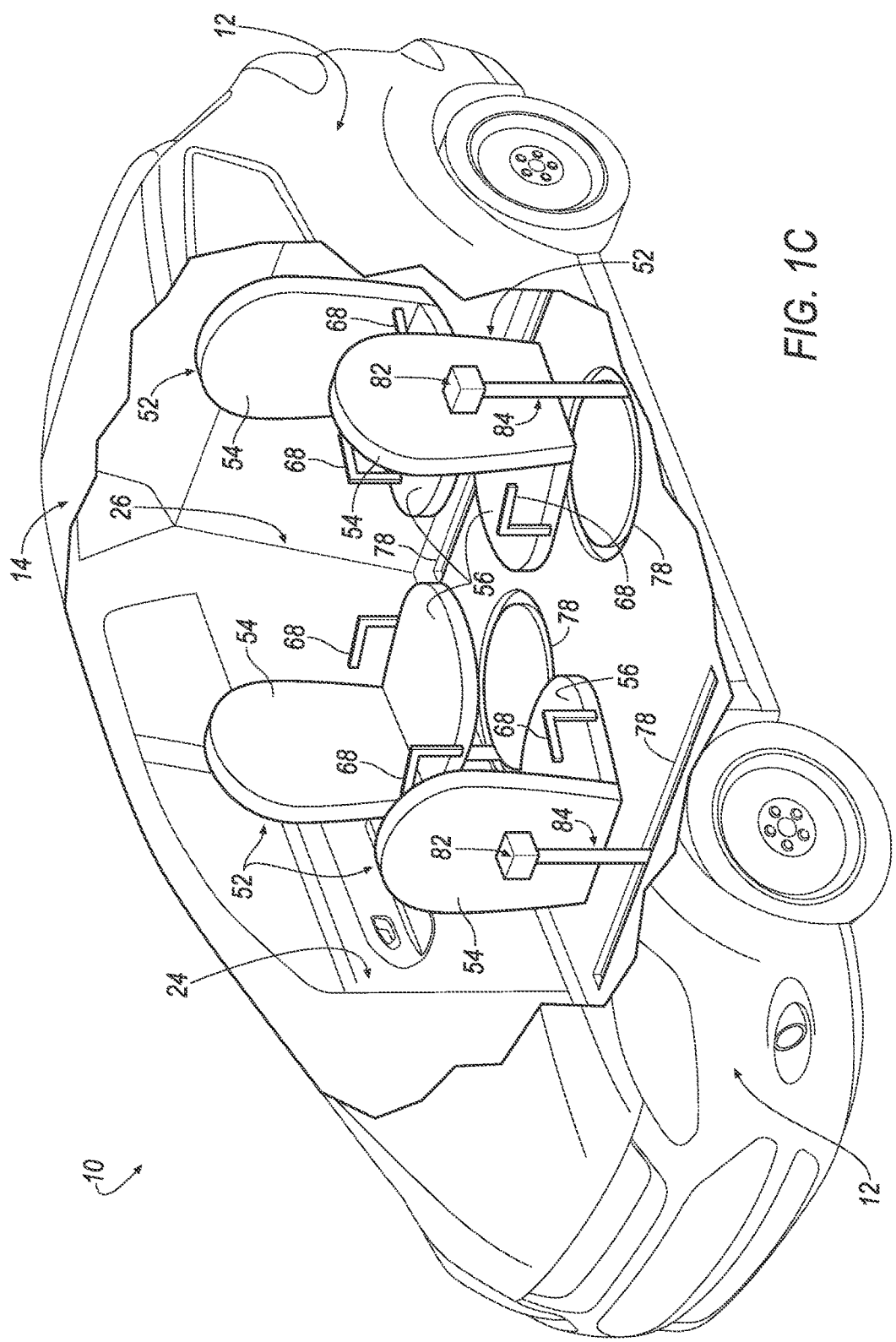
FIG. 1C is a cut-away perspective view of the vehicle.

In one approach, the first and second doors 22, 24 can be slidably mounted in openings 20 on the vehicle body 12. As shown in FIG. 1B, the first door 22 on the left side 16 of the vehicle body 12 is slidably opened to an open position relative to the vehicle body 12. Alternatively, doors can be pivotally mounted to the vehicle body 12.

Each of the first and second doors 22, 24 can include a door outer, a door inner (not shown), and a trim panel. The door outer may be fixed to the door inner by flanging, welding, or in any other suitable way. The door outer and the door inner may be formed of metal (e.g., aluminum, steel, etc.), composite material (e.g., fiber reinforced thermoplastic, sheet molding compound (SMC), etc., and/or other suitable materials. As discussed above, the door outer may have a class-A exterior surface facing exteriorly, i.e., the exterior surface, specifically manufactured to have a high-quality, finished aesthetic appearance free of blemishes.

The trim panel is fixed to the door inner in any suitable way, e.g., threaded fasteners, clips, push-pins, Christmas tree fasteners, etc. The trim panel may be formed of plastic, foam, leather, vinyl, etc. and combinations thereof. The trim panel may have a class-A surface facing the interior space 26 of the vehicle 10, i.e., a surface specifically manufactured to have a high-quality, finished aesthetic appearance free of blemishes.

As shown in FIGS. 2-4B, the floor 28 in the interior space 26 of the vehicle 10 can have a front end 30, a right end 32, a back end 34, and a left end 36. The floor 28 can include a front section 38, a back section 42, and a middle section 40 between the front and back sections 38, 42. A centerline C can extend from the front end 30 to the back end 34 of the floor 28.

Walls, such as front, right, back and left walls 44, 46, 48, 50, can define the front, right, back and left ends 30, 32, 34, 36 of the floor 28. For example, as shown in FIGS. 2-4B, a front wall 44 can be supported at the front end 30 of the floor 28 of the vehicle 10, a right wall 46 can be supported at the right end 32 of the floor 28, a back wall 48 can be supported at the back end 34 of the floor 28, and a left wall 50 can be supported at the left end 36 of the floor 28. The front, right, back and left walls 44, 46, 48, 50 can define an interior surface of the vehicle body 12.

While FIGS. 2-4B depict four walls 44, 46, 48, 50 located at the front, right, back, and left ends 30, 32, 34, 36 of the floor 28, it should be appreciated that this is for illustrative purposes only. The vehicle 10 can include more or fewer walls, and the walls can be in other locations.

For example, a wall (not shown) can also be supported between the front and middle sections 38, 40 of the floor 28, and extend in a cross-vehicle direction. Additionally and alternatively, another wall (not shown) can be supported between the middle and back sections 40, 42 of the floor 28, also extending in the cross-vehicle direction. Additionally and alternatively, another wall (not shown) can be supported on the centerline C of the floor 28, and extend in a vehicle-forward to vehicle-rearward direction.

The walls 44, 46, 48, 50 shown in FIGS. 2-4B can extend in a generally perpendicular direction relative to the floor 28. The walls 44, 46, 48, 50 can be formed of any suitable material, e.g., metal (e.g., aluminum, steel, etc.), composite materials (e.g., fiber reinforced thermoplastic, sheet molding compound (SMC), etc.

Trim panels can be attached to surfaces of the walls 44, 46, 48, 50. For example, trim panels can be attached to the walls 44, 46, 48, 50 with, e.g., threaded fasteners, clips, push-pins, Christmas tree fasteners, etc. As discussed above, the trim panels may be formed of plastic, foam, leather, vinyl, etc., and combinations thereof. The trim panels may have a class-A surface, i.e., a surface specifically manufactured to have a high-quality, finished aesthetic appearance free of blemishes, facing the interior space 26 of the vehicle 10.

The floor 28 and the front, right, back, and left walls 44, 46, 48, 50 define the interior space 26 of the vehicle 10. The vehicle 10 can also include a roof 14, as shown in FIGS. 1A-B. The roof 14 can further define the interior space 26 of the vehicle 10.

Referring back to FIGS. 2-4B, each of the front, right, back, and left walls 44, 46, 48, 50 include hangers 70, and the floor 28 includes tracks 78. The interior space 26 of the vehicle 10 includes four seats 52. It should be understood, however, that the vehicle 10 can include more or fewer hangers 70, more or fewer tracks 78, and more or fewer seats 52. It should also be understood that more than one seat 52 can be supported by a hanger 70 and a track 78.

Hangers 70 are located on a wall at a distance from the floor 28 such that a hanger 70 can support the seatback 54 of a seat 52. For example, the hangers 70 can be located on or integral with the wall at a height between, e.g., 8 and 72 inches above the floor 28.

Hangers 70 can be attached to the wall in any suitable manner, e.g., with bolts, screws, adhesives, and the like. Alternatively, the hangers 70 can be integral with a wall, i.e., the hanger 70 and the respective wall can be a single, monolithic part. The hangers 70 may be formed of metal (e.g., aluminum, steel, etc.), composite material (e.g., fiber reinforced thermoplastic, sheet molding compound (SMC), etc., or any suitable material. When integral with a wall, hangers 70 may be formed from the same materials as the wall.

The hangers 70 can be elongated. For example, as shown in FIGS. 2-4B, the hangers 70 on the front and back walls 44, 48 are elongated along a cross-vehicle axis in a substantially horizontal orientation.

As further shown in FIGS. 2-4B, the hangers 70 can have different lengths. For example, the hangers 70 on the right and left walls 46, 50 are a different length than the hangers 70 on the front and back walls 44, 48. The hanger 70 on the right wall 46 is disposed entirely on an interior surface of a B-pillar of the vehicle body 12, and the hanger 70 on the left wall 50 is disposed entirely on an interior surface of another B-pillar of the vehicle body 12.

Figure 5A:
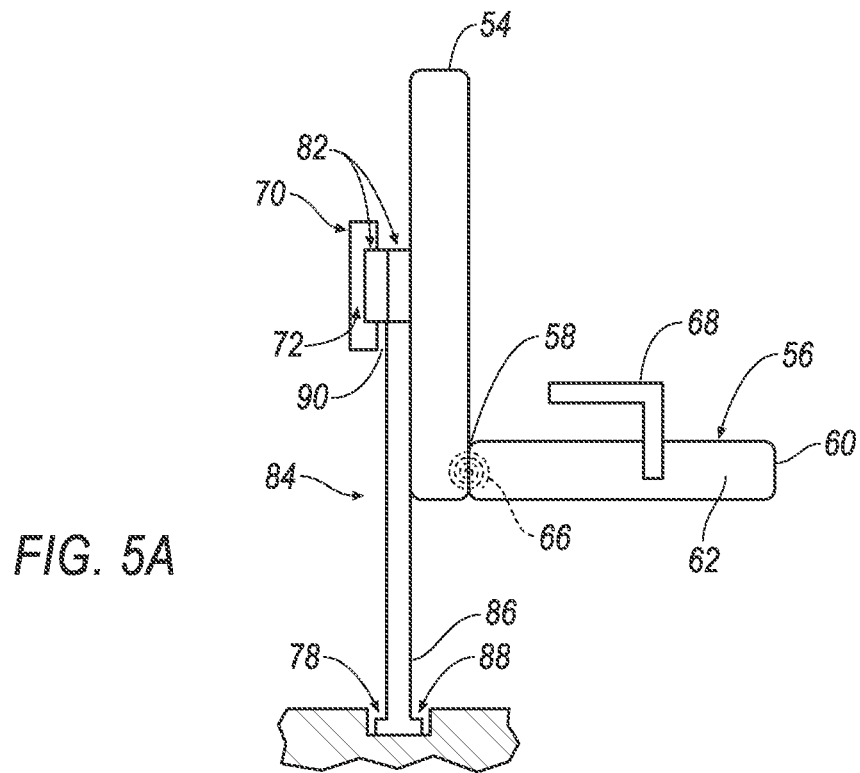
FIG. 5A is a side view of a seat in a seating position with a spring shown in hidden line.
Figure 5B:
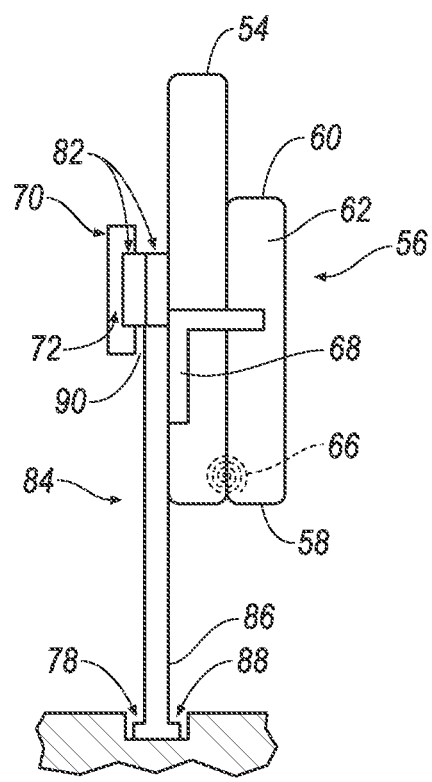
FIG. 5B is a side view of the seat of FIG. 5A in the stowed position with the spring shown in hidden line.

The hangers 70 can include a second track 72, as shown in FIGS. 5A-B. The second track 72 can have a C-shaped cross-section. The second track 72 can also be elongated. For example, the hangers 70 on the front and the back walls 44, 48 can each include a second track 72 elongated between a first end 74 and a second end 76 of the hangers 70.

Figure 4A:
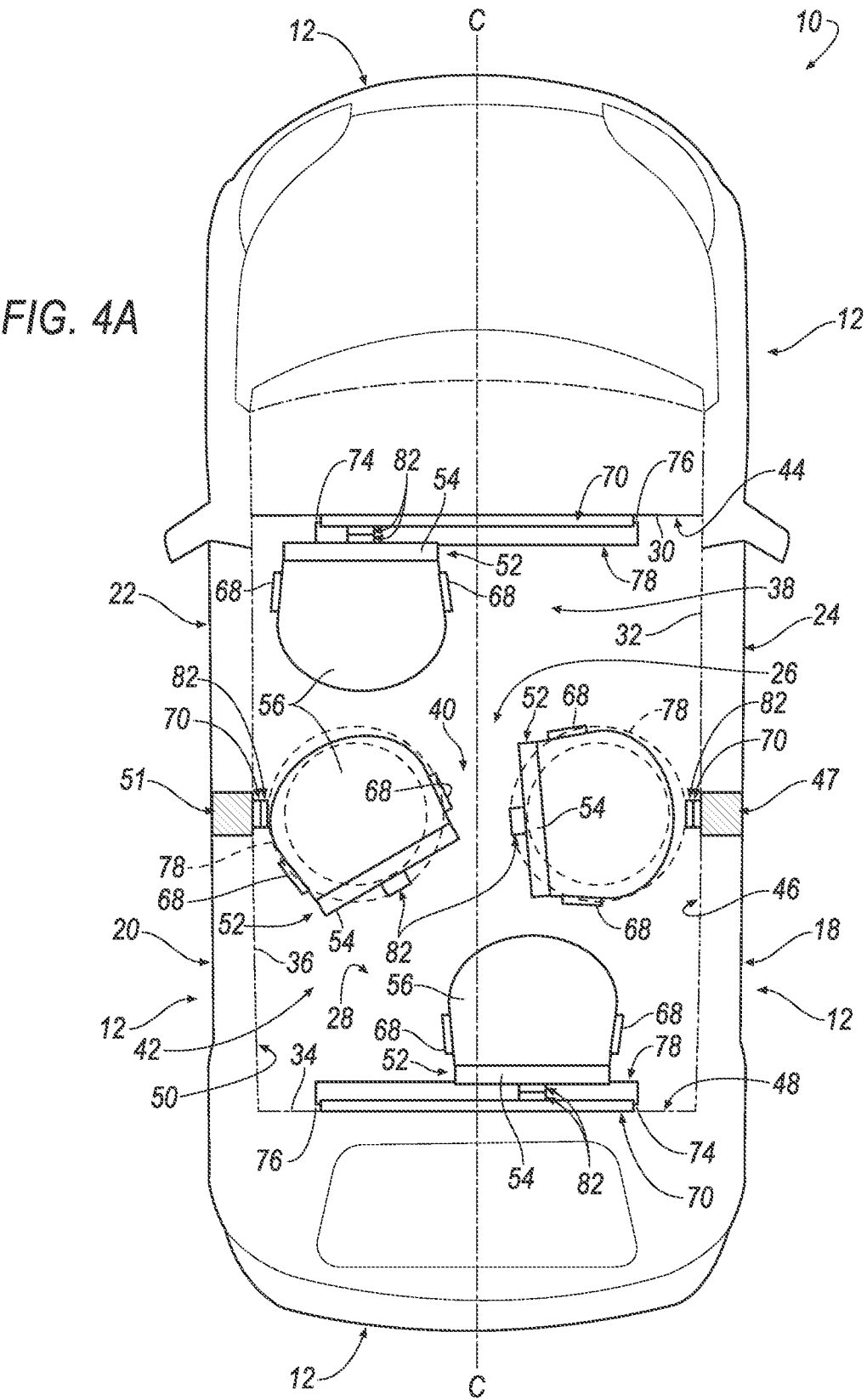
FIG. 4A is a cut-away top view of the vehicle with the seats in the seating position, connectors connected to the seatbacks and the seatbacks detached from hangers, and the seats rotated relative to a floor of the vehicle.

The hangers 70 and the seatbacks 54 of the seats 52 can include corresponding interfaces 82 such that the hangers 70 can support the seatbacks 54. For example, the hangers 70 can include connectors, as shown in FIG. 4B. Alternatively, the seatbacks 54 can include the connectors, as shown in FIG. 4A.

The connector can include a socket, a hook, a hook portion or a loop portion of a hook and loop fastener, or any other suitable mechanism that can provide a mechanical interlocking between the hanger 70 and the seatback 54 of a seat 52. Additionally and alternatively, the hanger 70 and/or the seatback 54 can include a magnet, an electromagnet, etc. In this way, the hanger 70 and the seatback 54 can mechanically and/or magnetically connect such that the hanger 70 can support the seatback 54.

When the hanger 70 includes the connector, the seatback 54 can include a corresponding interface 82. When the seatback 54 includes the connector, the hanger 70 can include the corresponding interface 82. For example, when the hanger 70 includes the connector and the connector includes a socket, the seatback 54 can include a corresponding interface 82 that includes a ball configured to be received and detachably retained by the socket.

As discussed above, a hanger 70 can include a second track 72. A connector can include a portion configured to be received and retained by the second track 72. The portion of the connector received and retained by the second track 72 can include, e.g., roller bearings, a slidable inner track, etc., such that the connector is slidably engaged with the second track 72. Thus, seats 52 can be slidably moveable relative to a wall, including when a seatback 54 of the seat 52 is supported by a hanger 70.

The floor 28 of the vehicle 10 includes at least one track 78. Tracks 78 can be attached to the floor 28 in any suitable manner, e.g., with bolts, screws, adhesives, and the like. Alternatively, tracks 78 can be integral with a floor 28. As shown in FIGS. 5A-B, the tracks 78 can be recessed in the floor 28.

The tracks 78 can be formed of metal (e.g., aluminum, steel, etc.), composite material (e.g., fiber reinforced thermoplastic, sheet molding compound (SMC)), etc., or any suitable material. When integral with the floor 28, the tracks 78 may be formed from the same materials as the floor 28.

The tracks 78 can be elongated. For example, as shown in FIGS. 1C-4B, the tracks 78 proximate the front and back walls 44, 48 are elongated along the cross-vehicle axis. As also shown in FIGS. 2-4B, tracks 78 can also extend along the floor 28 in a round arrangement. For example, the tracks 78 proximate to the right and left walls 46, 50 are arranged in a circular configuration.

While FIGS. 1C-4B depict tracks 78 having generally straight and circular configurations, it should be understood that this is for illustrative purposes only. The tracks 78 can be of various lengths and configurations, e.g., arced, curved, combinations of curved and straight, etc.

At least a portion of each track 78 is located at a distance from a wall having a hanger 70, such as walls 44, 46, 48, 50, such that a seatback 54 can be supported by the at least portion of the track and the hanger 70. For example, the at least a portion of the track 78 can be located between 1 and 30 inches from the wall 44, 46, 48, 50.

The tracks 78 can slidably support the seats 52. As further discussed below, for example, a seatback 54 of a seat 52 can include a post 84. A lower end 86 of the post 84 can connect to a base 88 that slidably engages the track 78. The base 88 can include, e.g., roller bearings, a slidable inner track, etc., received and retained by the track 78. In this way, the seat 52 can be slidably moveable relative to floor 28.

As discussed above and shown in FIGS. 5A-B, the seats 52 include a seatback 54 and a seat bottom 56. The seat bottom 56 can pivot relative to the seatback 54 of a seat 52 between the seating and the stowed positions.

The seatback 54 and seat bottom 56 can each include supporting frames (not shown). The seatback and seat bottom frames can be formed of, e.g., metal, including steel, aluminum, etc., and other suitable materials, such as plastic and/or composite materials, as well as a combination of materials. A spring 66, shown in hidden line in FIGS. 5A-B, can attach to the seatback and seat bottom frames. The spring 66 can be attached to the frames to bias the seat bottom 56 to the stowed position.

Additionally and alternatively, a motor (not shown) can be incorporated into the seats 52. The motor can be configured to pivot the seat bottom 56 between the stowed and seating positions. In this way, a user can pivot the seat bottoms 56 of the seats 52 by, e.g., voice activation, and/or pressing an input/output mechanism on the seat 52, a key fob, a touchscreen, etc.

The frames of the seatback 54 and seat bottom 56 can support foam cushions (and/or the like) having properties suitable for sitting upon. The seatback 54 and seat bottom 56 can include an outer cover of, e.g., cloth, leather or other suitable materials that cover the foam cushions and frames.

In addition, the seat bottom 56 extends from a first side 62 to a second side 64. A shown in FIG. 1C, armrests 68 can be fixed to the first and second sides 62, 64 of the seat bottom 56.

As discussed above and shown in FIGS. 1C, and 5A-B, the seatback 54 can include a post 84. The post 84 can be attached to the seatback 54 frame. The post 84 can be attached to the seatback 54 frame with fasteners, such as bolts, or in any other suitable manner, e.g., welding, adhesives, etc.

The post 84 has an upper end 90 and a lower end 86. The upper end 90 of the post 84 can be detachably mounted to a hanger 70 included on a wall, such as front, right, back and left walls 44, 46, 48, 50. The upper end 90 of the post 84 can be configured to be received and retained by the hanger 70.

As discussed above, the hanger 70 can include an interface 82, e.g., a connector, that corresponds with an interface 82 at the upper end 90 of the post 84. The connector can include an electromagnet, and the upper end 90 of the post 84 can include metals such as iron, nickel, and/or cobalt. As a result, the connector and the upper end 90 of the post 84 can magnetically connect together.

Moreover, the electromagnet can be configured to automatically turn on and off. For example, the electromagnet can be configured to turn on when a seat bottom 56 of a seat 52 is in the stowed position, and turn off when the seat bottom 56 is in the seating position. As such, when the seat bottom 56 of the seat 52 is in the seating position, e.g., when a passenger moves the seat bottom 56 of the seat 52 to the seating position, the seatback 54 can automatically disengage from the hanger 70.

When the seat 52 is disengaged from the hanger 70, the seat 52 may be supported by a track 78. As such, the seat 52 can be slidably moveable along the length of the track 78, including when the track 78 has portions that exceed a distance from a wall, such as front, right, back and left walls 44, 46, 48, 50, that included the hanger 70, such that the seat 52 could also be supported by the hanger 70.

Moreover, when disengaged from the hanger 70, the seat 52 is rotatable relative to the floor 28 of the vehicle 10. For example, the post 84 can be rotatable relative to the track 78.

Figure 6:
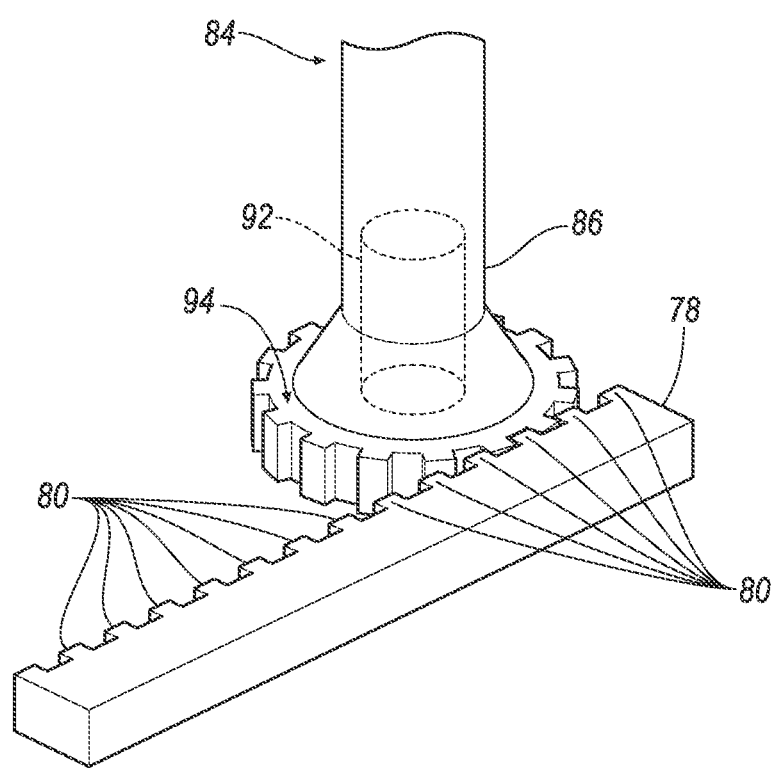
FIG. 6 is a partial view of a base of a post, a rotatable gear, a motor shown in hidden line, and a track including a plurality of teeth.

As discussed above, the lower end 86 of the post 84 can connect to a base 88 slidably supported by the track 78. In another approach, the tracks 78 can include a plurality of teeth 80 as shown in FIG. 6. The teeth 80 of the plurality of teeth 80 can be spaced from each other along a length of the track 78. The post 84 can include a motor 92 (shown in hidden line in FIG. 6) and a rotatable gear 94 connected to the motor 92.

The rotatable gear 94 can engage one or more of the plurality of teeth 80. In this way, when the motor 92 is activated, the rotatable gear 94 can rotate, and the seat 52 including the post having the motor 92 and the rotatable gear 94 can slidably move relative to the floor 28.

The disclosure has been described in an illustrative manner, and it is to be understood that the terminology which has been used is intended to be words of description rather than of limitation. Many modifications and variations of the present disclosure are possible considering the above teachings, and the disclosure may be practiced otherwise than as specifically described. The adjectives "first" and "second" are used herein as identifiers and are not intended to indicate an order or importance of the elements.

What is claimed is:

1. A vehicle comprising:
   a wall having a hanger;
   a floor having a track;
   a seatback including a post detachably connectable to the hanger, the post being supported by the track, and the post being slidably engaged with the track and slidable along a length of the track when the post is detached from the hanger; and
   a seat bottom supported by the seatback and pivotally attached to the seatback.

2. The vehicle of claim 1, wherein the hanger is elongated.

3. The vehicle of claim 2, wherein in the hanger includes a second track and the seatback is slidable along the second track when the seatback is engaged with and supported by the hanger.

4. The vehicle of claim 1, wherein the post includes an upper end detachably connectable to the hanger and a lower end supported by and slideably engaged with the track.

5. The vehicle of claim 4, further comprising a base connected to the lower end of the post, the base slidably engaged with the track.

6. The vehicle of claim 1, wherein the post includes a motor and a rotatable gear connected to the motor, and the track includes a plurality of teeth spaced from each other along a length of the track, wherein the rotatable gear engages one or more of the plurality of teeth of the track.

7. The vehicle of claim 1, wherein a spring engages the seat bottom and the seatback, biasing the seat bottom to a stowed position.

8. The vehicle of claim 1, wherein the seat bottom is pivotable between a stowed position and a seating position, and the seatback disengages from the hanger in the seating position.

9. The vehicle of claim 8, wherein the post is rotatable relative to the floor when the seat bottom is in the seating position.

10. The vehicle of claim 1, wherein the seat bottom extends from a first side to a second side, and an armrest is fixed to the first side.

11. The vehicle of claim 1, wherein the track extends along the floor in a round arrangement.

12. The vehicle of claim 1, further comprising a vehicle body having a left side and a right side, the vehicle body including a first door on the left side of the vehicle body and a second door on the right side of the vehicle body.

13. The vehicle of claim 12, wherein the first and second doors are slidably mounted to the vehicle body.

14. The vehicle of claim 1, wherein the hanger includes an electromagnet and the post is magnetically attracted to the electromagnet when the electromagnet is powered on.

* * * * *